US011047631B2

(12) United States Patent
Challa et al.

(10) Patent No.: US 11,047,631 B2
(45) Date of Patent: Jun. 29, 2021

(54) BUMPER CLIP FOR TUBE TYPE HEAT EXCHANGERS

(71) Applicant: Caterpillar Inc., Deerfield, IL (US)

(72) Inventors: Sharath Kumar Reddy Challa, Peoria, IL (US); James Mccoy Voelker, Metamora, IL (US); Derrick D. Goss, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 95 days.

(21) Appl. No.: 16/280,530

(22) Filed: Feb. 20, 2019

(65) Prior Publication Data
US 2020/0263937 A1    Aug. 20, 2020

(51) Int. Cl.
| | | |
|---|---|---|
| *F28F 9/013* | (2006.01) | |
| *F16B 2/22* | (2006.01) | |
| *F16L 3/10* | (2006.01) | |
| *F16L 3/223* | (2006.01) | |
| *F16L 3/23* | (2006.01) | |

(52) U.S. Cl.
CPC ............... *F28F 9/013* (2013.01); *F16B 2/22* (2013.01); *F16L 3/10* (2013.01); *F16L 3/2235* (2013.01); *F16L 3/23* (2013.01)

(58) Field of Classification Search
CPC ........ F28F 9/013; F28F 9/0132; F28F 9/0135; F28F 2225/04; F28F 2240/00; F28F 2265/30; F28F 2280/06; F16L 3/10; F16L 3/13; F16L 3/2235; F16L 3/23; F16L 3/006; F16L 3/222; F16L 3/08; F16L 3/1058; F16B 2/22
See application file for complete search history.

(56) References Cited

U.S. PATENT DOCUMENTS

| | | | | |
|---|---|---|---|---|
| 2,143,157 A | * | 1/1939 | *Kotzebue ............ | F28D 7/1638 165/82 |
| 3,422,884 A | * | 1/1969 | Otten .................... | F16L 3/2235 165/67 |
| 3,437,297 A | * | 4/1969 | Jirka ..................... | F28F 9/0131 248/68.1 |
| 3,545,537 A | * | 12/1970 | Hill, Jr. .................. | F28F 9/013 165/162 |
| 4,030,540 A | * | 6/1977 | Roma ................... | F28F 9/0132 165/172 |

(Continued)

FOREIGN PATENT DOCUMENTS

| | | |
|---|---|---|
| DE | 2300080 | 7/1974 |
| DE | 8600341 | 2/1986 |

(Continued)

OTHER PUBLICATIONS

EP0197812—English machine translation.pdf (Year: 1986).*

*Primary Examiner* — Jianying C Atkisson
*Assistant Examiner* — Jose O Class-Quinones
(74) *Attorney, Agent, or Firm* — Law Office of Kurt J. Fugman LLC

(57) ABSTRACT

A heat exchanger assembly includes a frame, a plurality of tubes, and a first bumper clip attaching at least a first tube of the plurality of tubes to the frame. The first tube defines a first exterior dimension and the first bumper clip defines a first tube slot defining a first tube slot dimension that is less than the first exterior dimension of the at least first tube.

6 Claims, 8 Drawing Sheets

(56) References Cited

U.S. PATENT DOCUMENTS

| | | | |
|---|---|---|---|
| 4,040,476 A * | 8/1977 | Telle | B63J 2/12 |
| | | | 165/76 |
| 4,114,683 A * | 9/1978 | Verlinden | F28B 1/06 |
| | | | 165/78 |
| 4,167,211 A * | 9/1979 | Haller | F28F 9/0132 |
| | | | 165/162 |
| 4,616,390 A * | 10/1986 | MacCracken | F28D 20/021 |
| | | | 165/162 |
| 4,671,347 A * | 6/1987 | MacCracken | F28D 20/021 |
| | | | 165/10 |
| 4,936,530 A * | 6/1990 | Wollar | F16B 2/12 |
| | | | 248/68.1 |
| 5,743,328 A * | 4/1998 | Sasaki | F28D 1/0417 |
| | | | 165/144 |
| 5,914,154 A * | 6/1999 | Nemser | A61L 9/16 |
| | | | 427/235 |
| 6,487,768 B2 * | 12/2002 | Rhodes | B29C 65/58 |
| | | | 29/564.8 |
| 6,746,761 B2 * | 6/2004 | Janoff | E21B 36/00 |
| | | | 428/327 |
| 7,145,112 B1 | 12/2006 | Daughtry, Sr. | |
| 8,020,259 B2 * | 9/2011 | Ho | F16L 3/222 |
| | | | 24/129 R |
| 8,561,679 B2 * | 10/2013 | Richardson | F28F 21/084 |
| | | | 165/173 |
| 9,091,486 B2 * | 7/2015 | Cinotti | F28F 27/02 |
| 9,869,421 B2 | 1/2018 | *Fox | |
| 2001/0040021 A1 | 11/2001 | Avequin et al. | |
| 2002/0148116 A1 | 10/2002 | Rhodes | |
| 2005/0173597 A1 | 8/2005 | *Farrell et al. | |
| 2010/0116481 A1 * | 5/2010 | Evans | F28D 1/05391 |
| | | | 165/173 |
| 2012/0103582 A1 * | 5/2012 | Kim | F28F 1/32 |
| | | | 165/173 |
| 2012/0103583 A1 * | 5/2012 | Kim | F28D 1/05391 |
| | | | 165/173 |
| 2012/0267088 A1 * | 10/2012 | Lange | F28D 15/0233 |
| | | | 165/181 |
| 2015/0247677 A1 | 9/2015 | Cochran et al. | |
| 2017/0219126 A1 | 8/2017 | *Kato | |
| 2018/0120040 A1 | 5/2018 | Bireaud et al. | |
| 2018/0266775 A1 | 9/2018 | Parker | |

FOREIGN PATENT DOCUMENTS

| | | | |
|---|---|---|---|
| DE | 4210468 C2 | 6/1994 | |
| DE | 19628523 | 11/1997 | |
| EP | 0197812 A1 * | 10/1986 | F28D 7/028 |
| KR | 101473799 B1 | 12/2014 | |

* cited by examiner

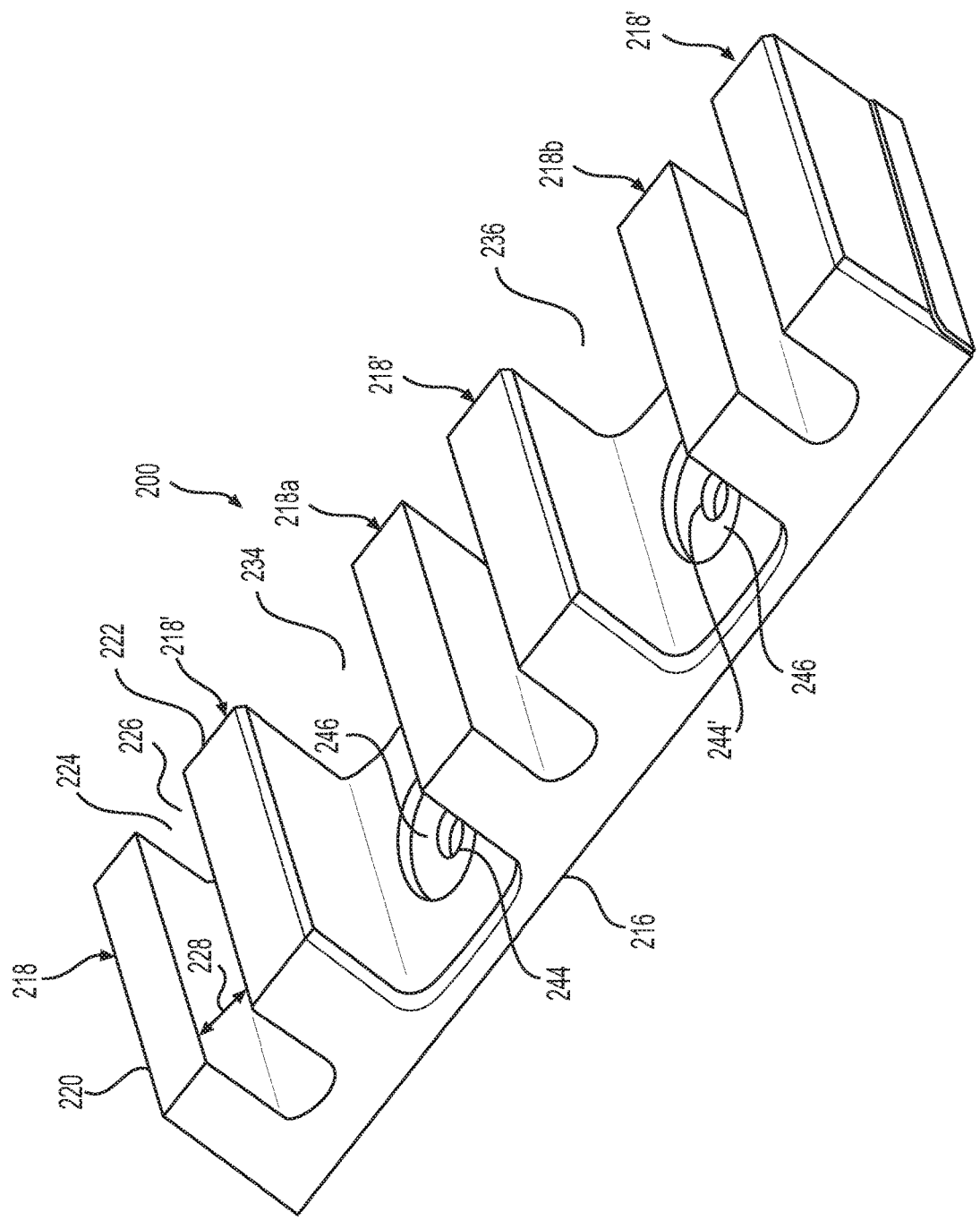

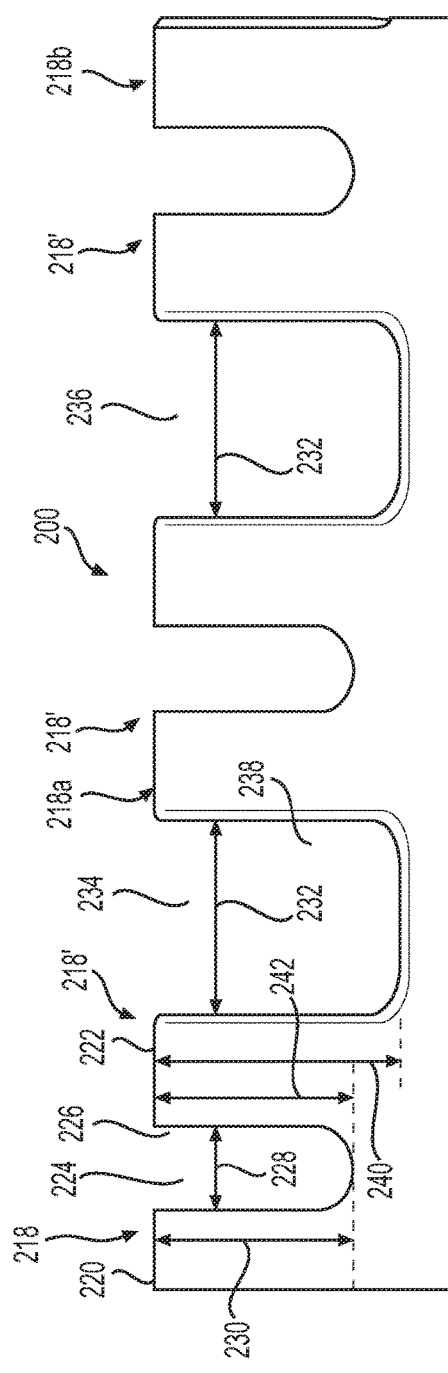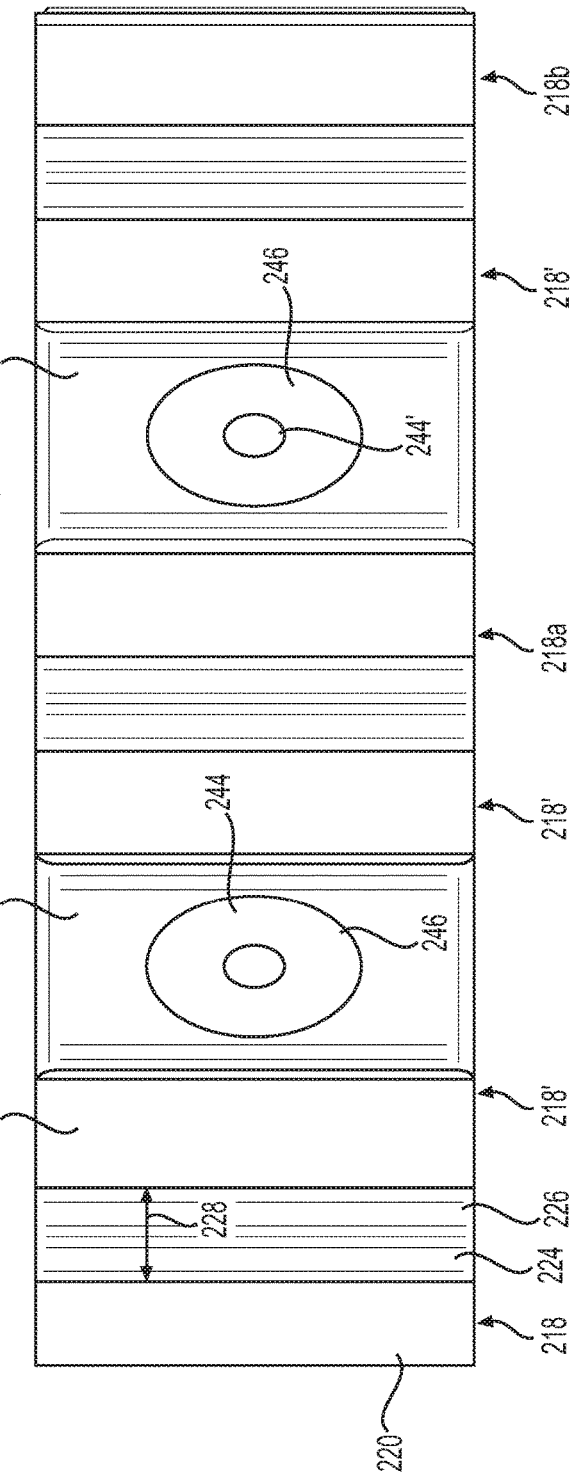

BUMPER CLIP FOR TUBE TYPE HEAT EXCHANGERS

TECHNICAL FIELD

The present disclosure relates to support clips used to attach heat exchangers to the frame or chassis of a machine. Specifically, the present disclosure relates to a bumper clip used to hold onto the tubes of a tube type heat exchanger of earth moving, construction, and mining machines and the like.

BACKGROUND

Machines, such as those used in the earth moving, construction, and mining industries use heat exchangers to cool engines or other heat producing devices. Support clips are often employed to attach the tube of a heat exchanger, such as a radiator, air-to-air after cooler or the like, to a frame or chassis. The interface between the clip and tube may experience play that may be caused by internal or external causes. Internal causes of this play may include erosion that occurs due to cavitation of the fluid flowing through the tube, leading to the tube wall deforming inwardly. External causes may include dimensional growth or contraction of the support clip due to changes in temperature or moisture, etc.

Play between the support clip and the tube may lead to further issues with wear and/or an improper orientation of the heat exchanger relative to the flow of air meant to draw heat from the tube. Moreover, debris may accumulate between the surfaces of the tube and the clip, leading to tube and/or clip damage, decreasing the ability of the clip to properly hold the tube. More particularly, tube clips are typically designed to constrain the tube from fore-aft and side to side motion as well as limit any bending of the tube or displacement of the tube in different directions. These performances of the clip may be compromised if debris accumulates between the surfaces of the tube and the clip.

U.S. Pat. Application Publ. No. 2005/0173597 to Farrell et al. discloses a support clip for tubes used in a roof cooling system. More particularly, Farrell discloses a support block and a system for roof cooling. The support block supports a pipe above a structure, wherein the pipe has a cross-sectional area and a diameter of predetermined dimensions, and the support block includes a number of outer surfaces each having an opening and a cavity. Each cavity has a cross-sectional area larger than the cross-sectional area of a pipe and the opening can be less than the diameter of the cavity cross-sectional area or slightly less than the diameter of the pipe. Dovetail notches on the surfaces of the support block are present to attach the support block onto the roof. Adhesives can be used in the dovetail notches or an adapter plate attached to the roof can be used to attach the support block to the adapter plate. Alternatively, the support block can be used to assist in supporting and routing any type of conduit or cabling.

As can be seen, Farrell does not adequately address the aforementioned problems since it does not teach how to hold a multitude of tubes in a three dimensional array of a heat exchanger while also attaching the tubes to be reliably attached to the frame of a radiator, air-to-air after cooler, etc.

SUMMARY

A heat exchanger assembly according to an embodiment of the present disclosure is provided and may include a frame, a plurality of tubes, and a first bumper clip attaching at least a first tube of the plurality of tubes to the frame. The first tube may define a first exterior dimension and the first bumper clip may define a first tube slot defining a first tube slot dimension that is less than the first exterior dimension of the at least first tube.

A bumper clip according to an embodiment of the present disclosure is provided and may comprise a base portion, and a first U-shaped portion including a first leg and a second leg that is spaced away from the first leg, defining a first slot with an open end and defining a slot width. The first leg may define a first leg length and a ratio of the first leg length to the slot width may range from 1.5 to 5.0.

A bumper clip according to another embodiment of the present disclosure is provided and may comprise a serpentine body extending along a sweep path and defining a plurality of tube holding notches including a first tube holding notch disposed along the sweep path facing in a first direction and a second tube holding notch disposed adjacent the first tube holding notch along the sweep path, the second tube holding notch facing in a second direction that is opposite of the first direction. The first tube holding notch may define a first tube holding notch depth and a first tube holding notch width, and a ratio of the first tube holding notch depth to the first tube holding notch width may range from 1.5 to 5.0.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 5 is a perspective view of a bumper clip according to a first embodiment of the present disclosure that is used to attach an outside tube to the frame of the heat exchanger assembly.

FIG. 6 is a front view of the bumper clip of FIG. 5.

FIG. 7 is a top view of the bumper clip of FIG. 5.

DETAILED DESCRIPTION

Figure 1:
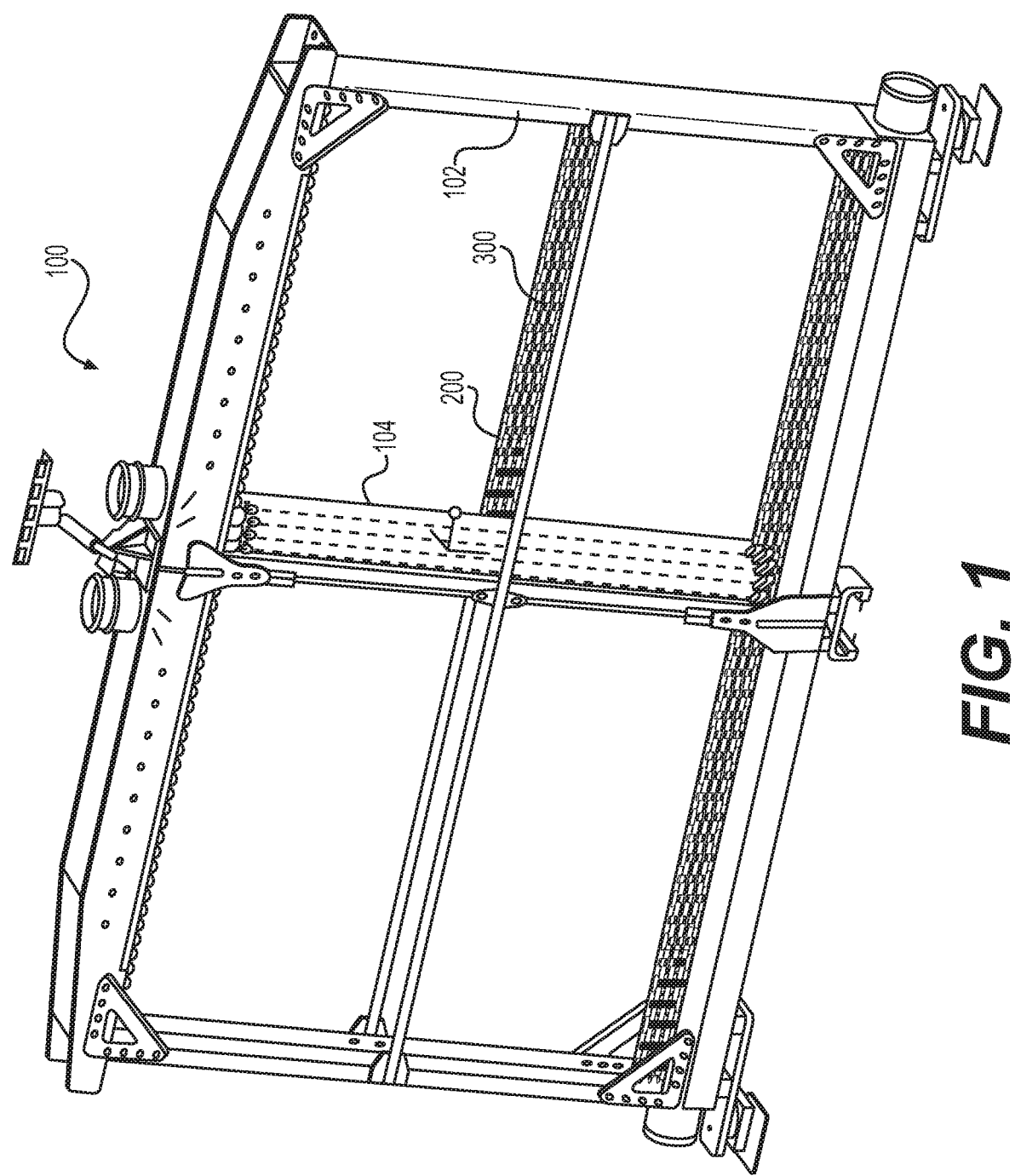
FIG. 1 is a perspective view of a heat exchanger assembly showing the use of bumper clips according to various embodiments of the present disclosure with some of the tubes of the heat exchanger omitted for enhanced clarity.
Figure 2:
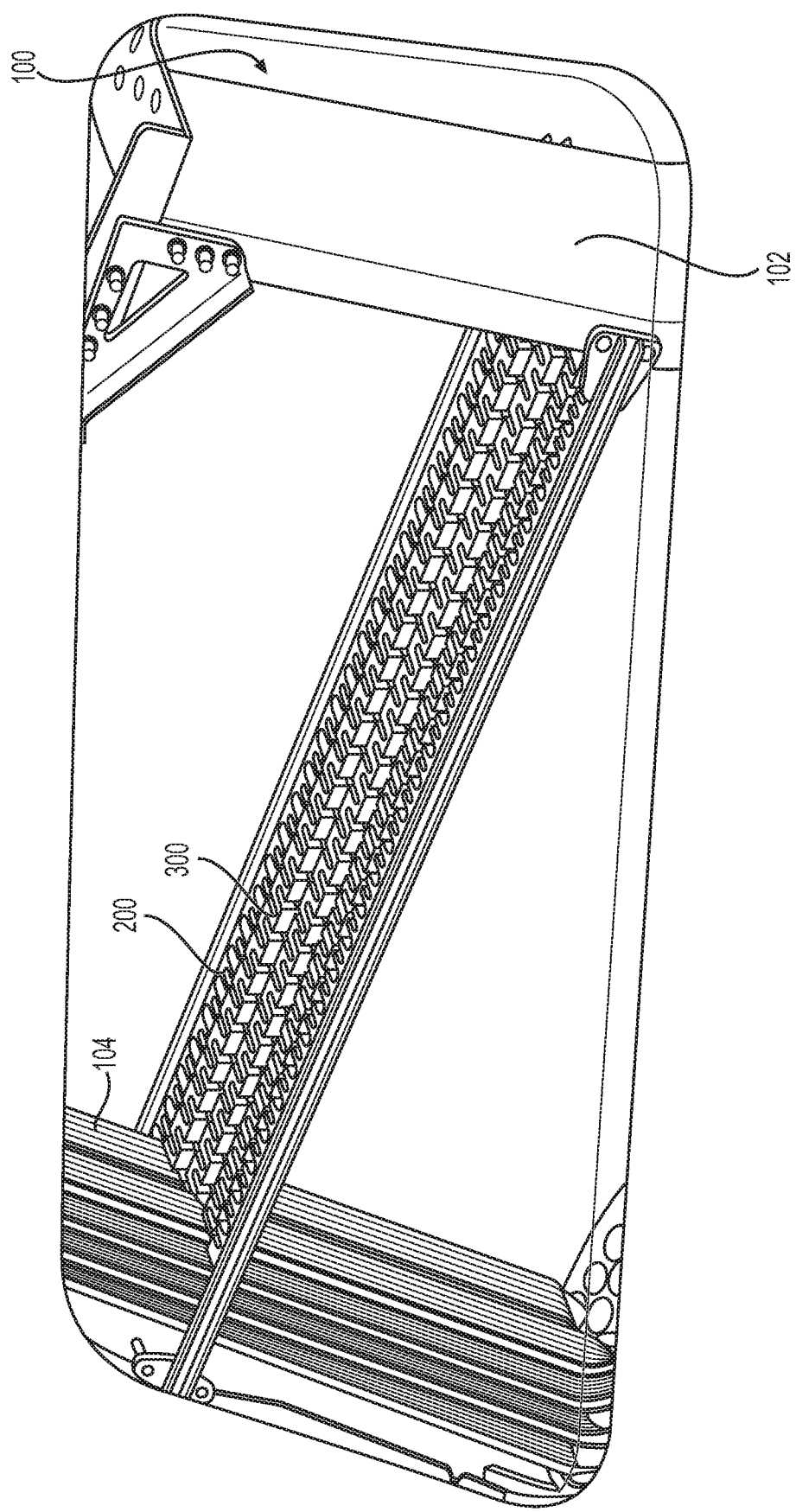
FIG. 2 is an enlarged perspective view of the bumper clips used in the heat exchanger assembly of FIG. 1.
Figure 3:
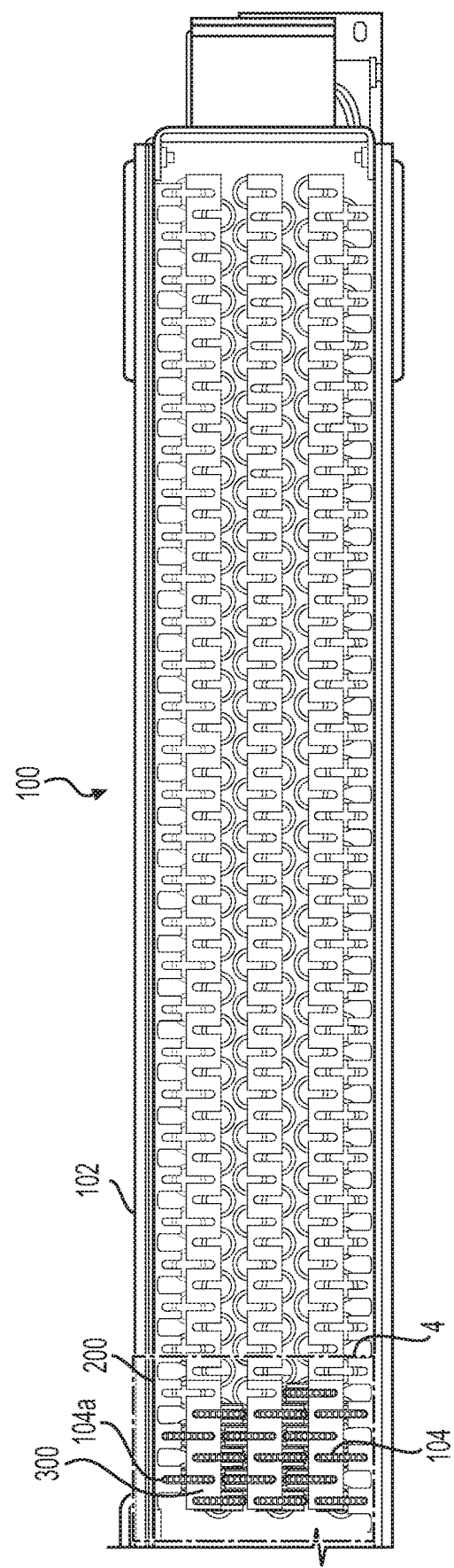
FIG. 3 is a top sectional view of the heat exchanger assembly of FIG. 2.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100"

etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a heat exchanger assembly and bumper clips intended to hold the tubes of a tube type heat exchanger attaching the same to a frame of a machine or the heat exchanger will now be described with reference to FIGS. 1 thru 10. In some embodiments, the bumper clips are designed to have an interference fit with the tube, helping to prevent debris accumulation between the surfaces of the tube and the clip, which may cause damage to the tube or the clip. For example, a tube with a width measured as "X" may be pressed into a bumper slot with a width measured as "0.9X" depending on the material that is used to make the bumper clip. Also, the bumper clip may be custom cut to different lengths depending on the number to tubes that are needed to be held. The heat exchanger may take various forms including an air-to-air after cooler as shown in FIGS. 1 thru 10, but it is to be understood that other applications are possible.

Figure 4:
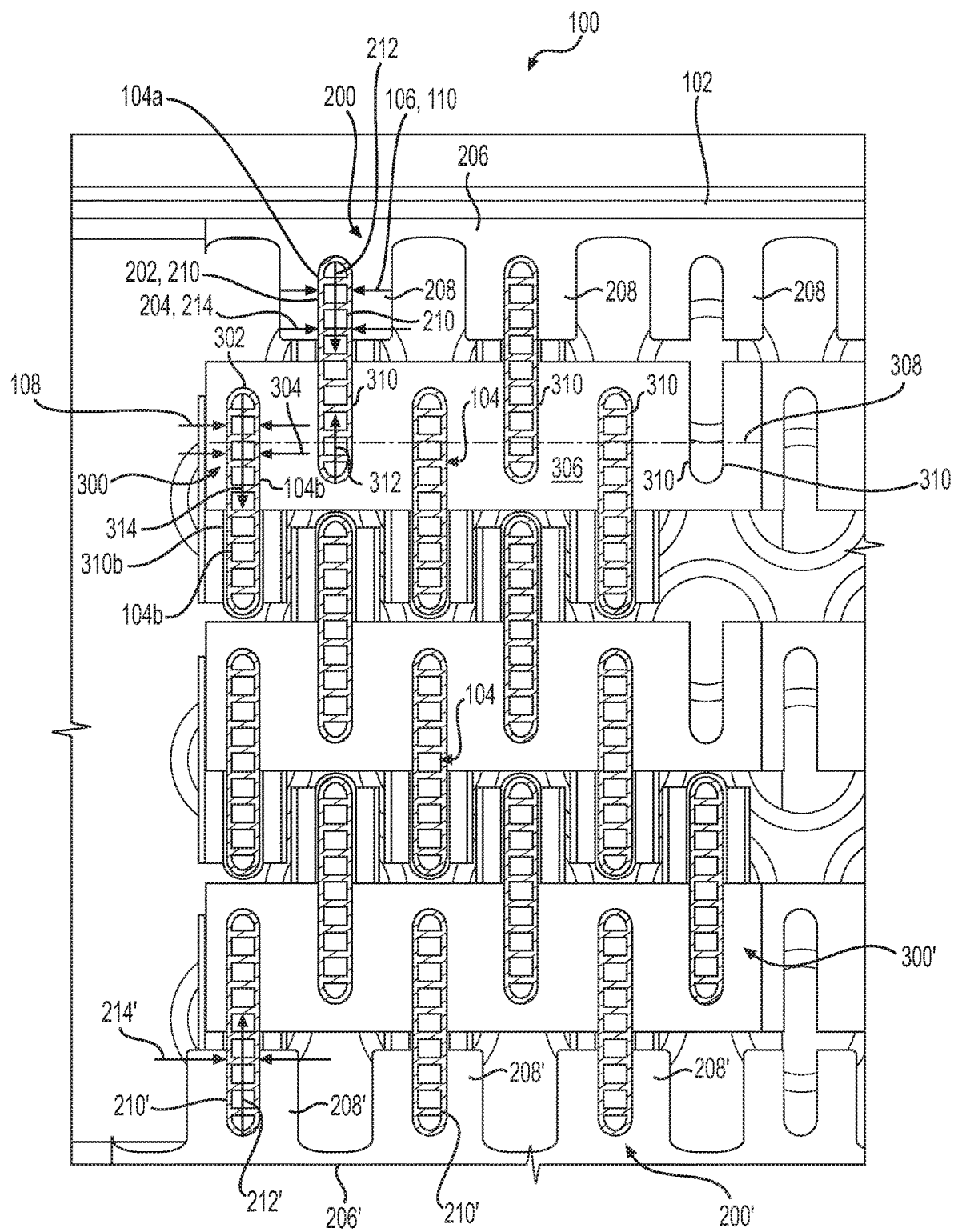
FIG. 4 is an enlarged top sectional view of the heat exchanger assembly of FIG. 3, showing various embodiments of the bumper clips holding the tubes in position.

A heat exchanger assembly according to an embodiment of the present disclosure will now be discussed with reference to FIGS. 1 thru 4. The heat exchanger assembly 100 may comprise a frame 102, a plurality of tubes 104, and a first bumper clip 200 attaching at least a first tube 104*a* of the plurality of tubes 104 to the frame 102. As best seen in FIG. 4, the first tube 104*a* may define a first exterior dimension 106 and the first bumper clip 200 may define a first tube slot 202 defining a first tube slot dimension 204 that is less than the first exterior dimension 106 of the at least first tube 104*a*.

The heat exchanger assembly 100 may further comprise a second bumper clip 300 that is differently configured than the first bumper clip 200. The second bumper clip 300 may attach at least a second tube 104*b* of the plurality of tubes 104 to the first tube 104*a*. The second tube 104*b* defines a second exterior dimension 108 and the second bumper clip 300 defines a second tube slot 302 defining a second tube slot dimension 304 that is less than the second exterior dimension 108 of the second tube 104*b*.

As also best seen in FIG. 4, the first bumper clip 200 may comprise a first straight spine 206 and a first plurality of prong portions 208. Each of the first plurality of prong portions 208 may define a first bumper clip tube holding aperture 210 facing in the same direction 212. The plurality of tubes 104 may all define the same exterior dimension 110 (e.g. the same as the first exterior dimension 106) and each first bumper clip tube holding aperture 210 may define the same first bumper clip tube holding aperture dimension 214 that is less than the same exterior dimension 110 of the plurality of tubes 104.

The second bumper clip 300 may comprise a serpentine body 306 extending along a sweep path 308 and may define a plurality of tube holding notches 310 including a first tube holding notch 310*a* disposed along the sweep path 308 facing in a first direction 312 and a second tube holding notch 310*b* disposed adjacent the first tube holding notch 310*a* along the sweep path 308, the second tube holding notch 310*b* facing in a second direction 314 that is opposite of the first direction 312.

The heat exchanger assembly 100 may further comprise a third bumper clip 200' that is identically configured as the first bumper clip 200. The third bumper clip 200' may comprise a second straight spine 206' and a second plurality of prong portions 208'. Each of the second plurality of prong portions 208' may define a third bumper clip tube holding aperture 210' facing in the opposite direction 212' as compared to the same direction 212 the first bumper clip tube holding aperture 210 faces. The plurality of tubes 104 may all define the same exterior dimension 110 and each third bumper clip tube holding aperture 210' may define the same third bumper clip tube holding aperture dimension 214' that is less than the same exterior dimension 110 of the plurality of tubes 104.

Similarly, the heat exchanger assembly 100 may further comprise a fourth bumper clip 300' that is identically configured as the second bumper clip 300. The fourth bumper clip 300' may be disposed between the second bumper clip 300 and the third bumper clip 200' and may also hold at least some of the plurality of tubes 104.

Turning now to FIGS. 5 thru 7, various features of the first bumper clip 200 will now be discussed in isolation from the heat exchanger assembly 100. The first bumper clip 200 may comprise a base portion 216, and a first U-shaped portion 218 including a first leg 220 and a second leg 222 that is spaced away from the first leg 220, defining a first slot 224 with an open end 226 and defining a first slot width 228. As best seen in FIG. 6, the first leg 220 may defines a first leg length 230 and a ratio of the first leg length 230 to the first slot width 228 may range from 1.5 to 5.0.

The first bumper clip 200 may further comprise a plurality of U-shaped portions 218' including the first U-shaped portion 218. Each of the plurality of U-shaped portions 218' may be identically configured as the first U-shaped portion 218. For the particular embodiment shown in FIGS. 5 thru 7, the plurality of U-shaped portions 218' includes a first U-shaped portion 218, a second U-shaped portion 218*a*, and a third U-shaped portion 218*b*. Other configurations and number of these features may be employed in other embodiments of the present disclosure.

Returning to FIG. 6, the second U-shaped portion 218*a* may be spaced away from the first U-shaped portion 218 a first predetermined distance 232 forming a first mounting aperture 234. Likewise, the third U-shaped portion 218*b* is spaced away from the second U-shaped portion 218*a* the same first predetermined distance 232 forming a second mounting aperture 236. The first predetermined distance 232 may be greater than the first slot width 228. This may not be the case in other embodiments.

The first mounting aperture 134 may be a thru-slot 238 and may define a first mounting aperture depth 240 that is greater than the first leg length 230. Other configurations and dimensions are possible for these features are possible in other embodiments of the present disclosure.

In like fashion, the second leg 222 of the first U-shaped portion 218 may define a second leg length 242 that is the same as the first leg length 230 but not necessarily so.

As best seen in FIGS. 5 and 7, the base portion 216 may further define a first fastener receiving aperture 244 that is in communication with the first mounting aperture 234 and that extends perpendicularly to the first mounting aperture 234. A second fastener receiving aperture 244' that is in communication with the second mounting aperture 236 and that extends perpendicularly to the second mounting aperture 236. Counterbores 246 for receiving the head of a fastener may also be provided. The first mounting aperture 234 may be identically configured as the second mounting aperture 236 and the first fastener receiving aperture 244 may be identically configured as the second fastener receiving aperture 244'. These features may be altered to be differently configured in other embodiments of the present disclosure.

The first bumper clip 200 may be manufactured from a material sold under the Tradename of SMOOTH-SIL 960 (a platinum cured silicone rubber) but other materials (e.g. aluminum, thermoplastics, other thermosets, etc.) may be used in other embodiments.

Figure 8:
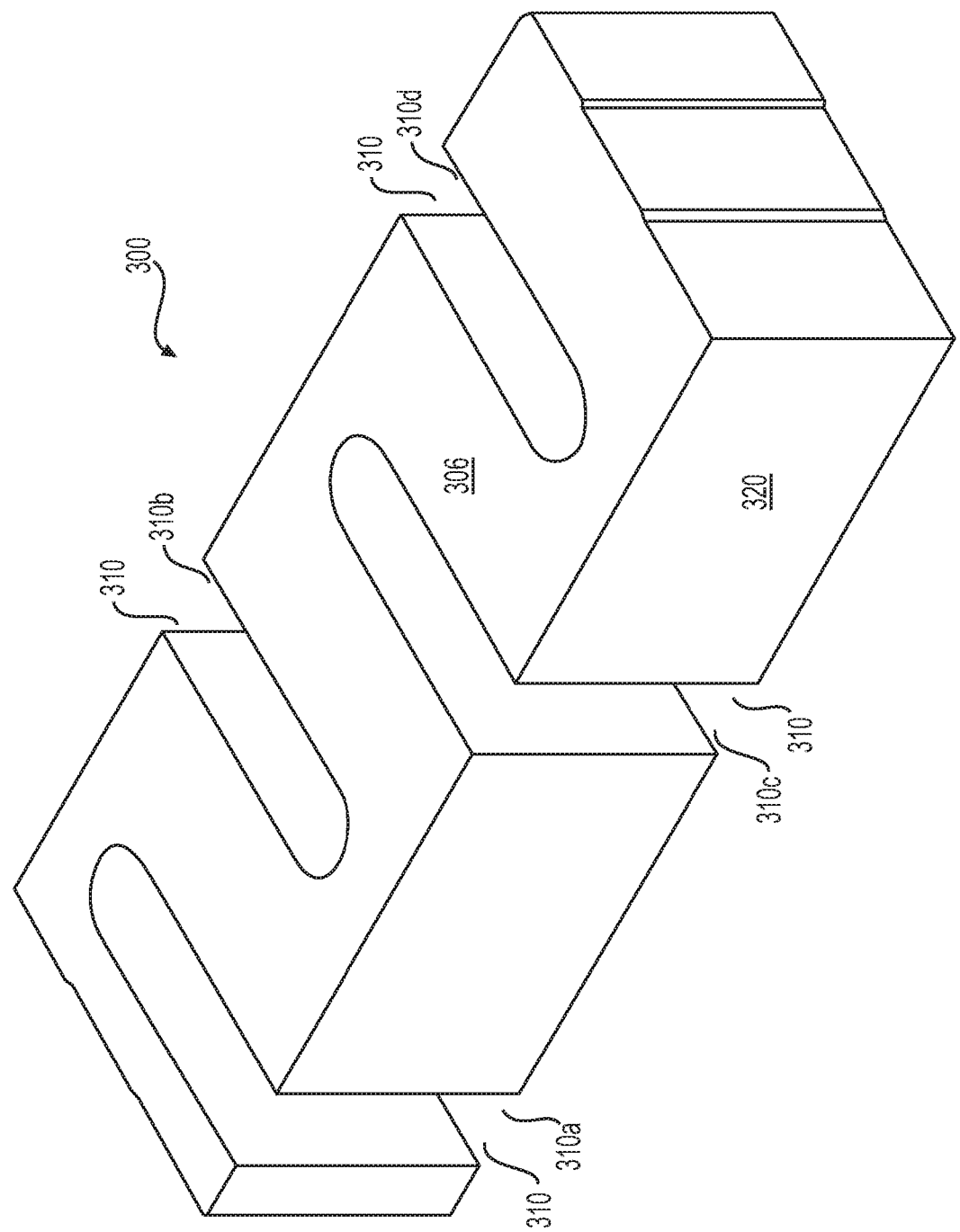
FIG. 8 is a perspective view of a bumper clip according to a second embodiment of the present disclosure that is used to space inside tubes of the heat exchanger assembly from each other.

Looking at FIGS. 8 thru 10, various features of the second bumper clip 300 will now be described in isolation from the heat exchanger assembly 100. The second bumper clip 300 may comprise a serpentine body 306 extending along a sweep path 308 and may define a plurality of tube holding notches 310 including a first tube holding notch 310a disposed along the sweep path 308 facing in a first direction 312 and a second tube holding notch 310b disposed adjacent the first tube holding notch 310a along the sweep path 308. The second tube holding notch 310b may face in a second direction 314 that is opposite of the first direction 312.

Figure 9:
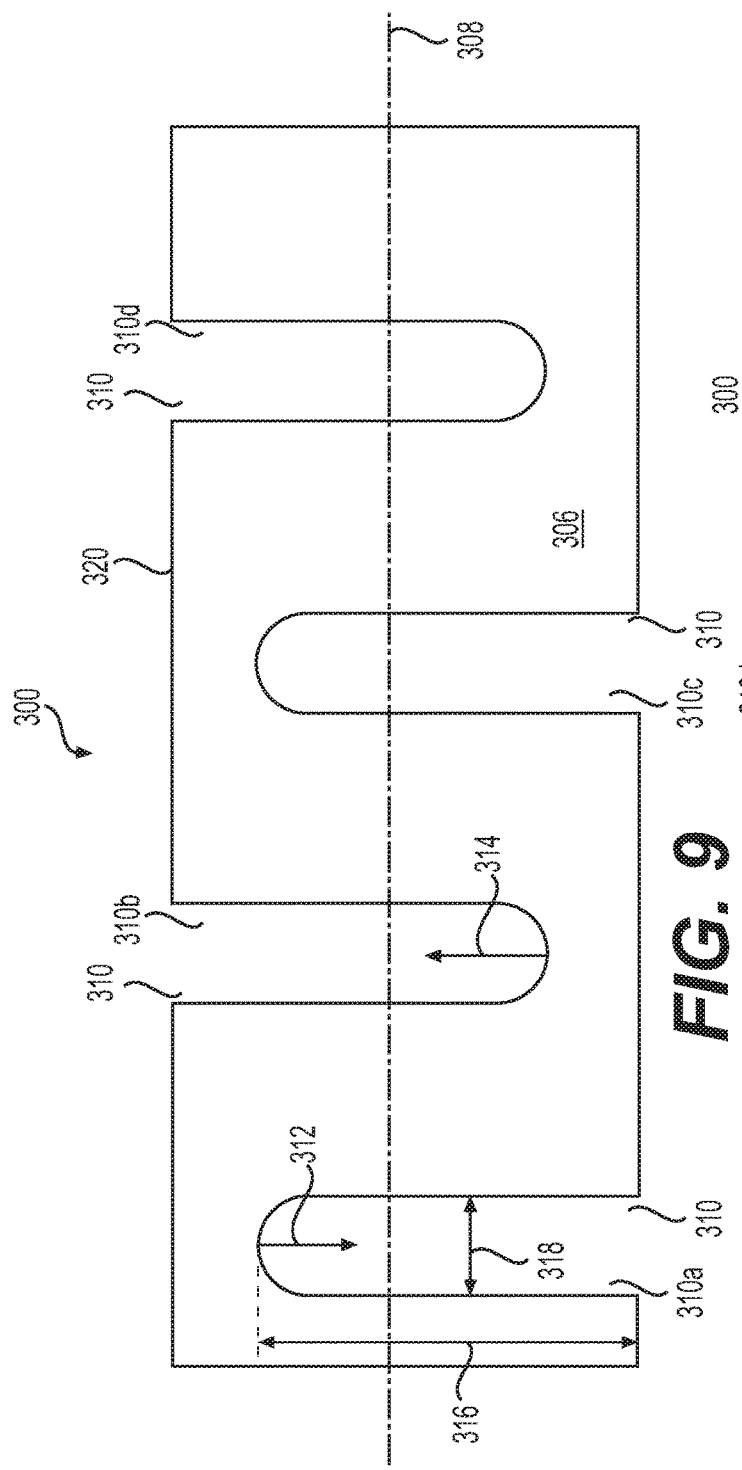
FIG. 9 is a top view of the bumper clip of FIG. 8.
Figure 10:
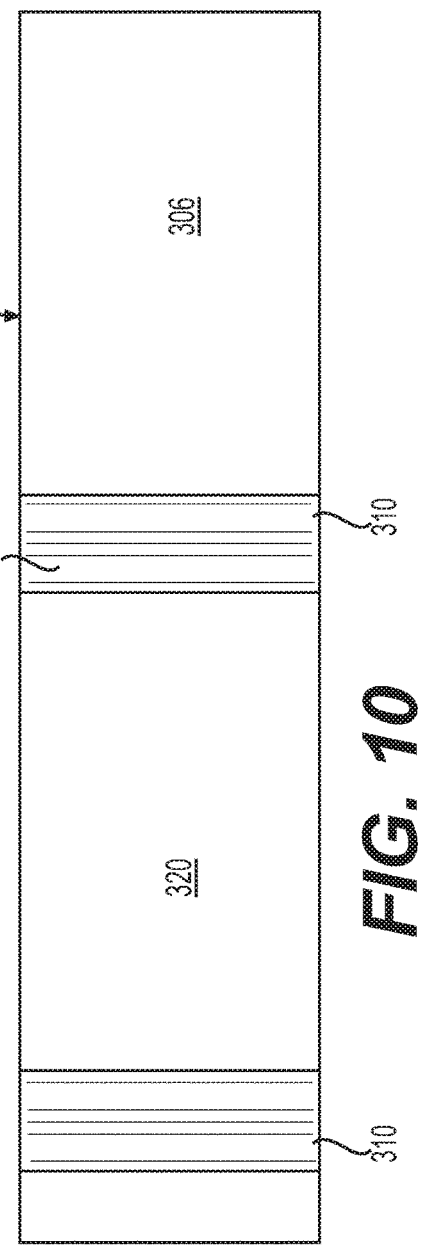
FIG. 10 is a front view of the bumper clip of FIG. 8.

As best seen in FIG. 9, the first tube holding notch 310a may define a first tube holding notch depth 316 and a first tube holding notch width 318. A ratio of the first tube holding notch depth 316 to the first tube holding notch width 318 may range from 1.5 to 5.0. Each of the plurality of tube holding notches 310 may be identically configured. The serpentine body 306 may define a generally rectangular perimeter 320. The plurality of tube holding notches 310 includes a third tube holding notch 310c and a fourth tube holding notch 310d. The third tube holding notch 310c may be identically configured as the first tube holding notch 310a and the fourth tube holding notch 310d may be identically configured as the second tube holding notch 310b.

The second bumper clip 300 may be manufactured from similar or dissimilar materials as the first bumper clip.

Any of the dimensions, configurations, materials, etc. discussed herein may be varied as needed or desired to be different than any value or characteristic specifically mentioned herein or shown in the drawings for any of the embodiments.

INDUSTRIAL APPLICABILITY

In practice, a heat exchanger assembly, a bumper clip, and/or a machine using any embodiment disclosed herein may be sold, bought, manufactured or otherwise obtained in an OEM (original equipment manufacturer) or after-market context. In some cases, various components, of the heat exchanger assembly, of the bumper clip, machine, etc. may be provided as a kit.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A bumper clip comprising:
a base portion;
a first U-shaped portion including a first leg and a second leg that is spaced away from the first leg, defining a first slot with an open end and defining a first slot width;
wherein the first leg defines a first leg length and a ratio of the first leg length to the first slot width ranges from 1.5 to 5.0; and
further comprising a plurality of U-shaped portions including the first U-shaped portion, a second U-shaped portion, and a third U-shaped portion, each of the plurality of U-shaped portions being identically configured as the first U-shaped portion, and the second U-shaped portion is spaced away from the first U-shaped portion a first predetermined distance forming a first mounting aperture;
the third U-shaped portion is spaced away from the second U-shaped portion the same first predetermined distance forming a second mounting aperture; and
the first predetermined distance is greater than the first slot width.

2. The bumper clip of claim 1 wherein the first mounting aperture is a thru-slot and defines a first mounting aperture depth that is greater than the first leg length.

3. The bumper clip of claim 2 wherein the second leg of the first U-shaped portion defines a second leg length that is the same as the first leg length.

4. The bumper clip of claim 2 wherein the base portion further defines a first fastener receiving aperture that is in communication with the first mounting aperture and that extends perpendicularly to the first mounting aperture and a second fastener receiving aperture that is in communication with the second mounting aperture and that extends perpendicularly to the second mounting aperture.

5. The bumper clip of claim 4 wherein the first mounting aperture is identically configured as the second mounting aperture and the first fastener receiving aperture is identically configured as the second fastener receiving aperture.

6. The bumper clip of claim 5 comprising platinum cured silicone rubber.

* * * * *